May 2, 1939.  E. E. BROSIUS  2,156,967

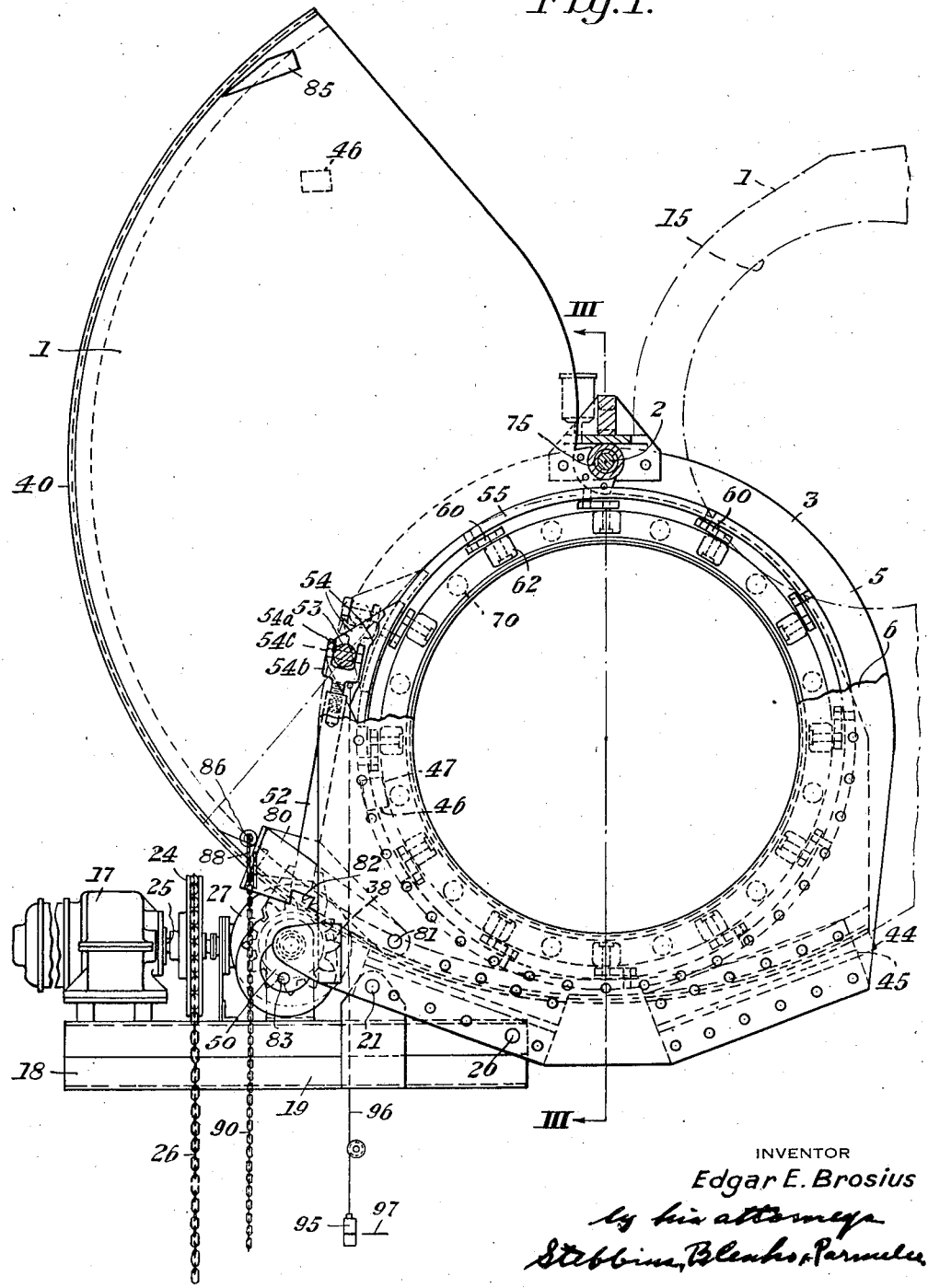

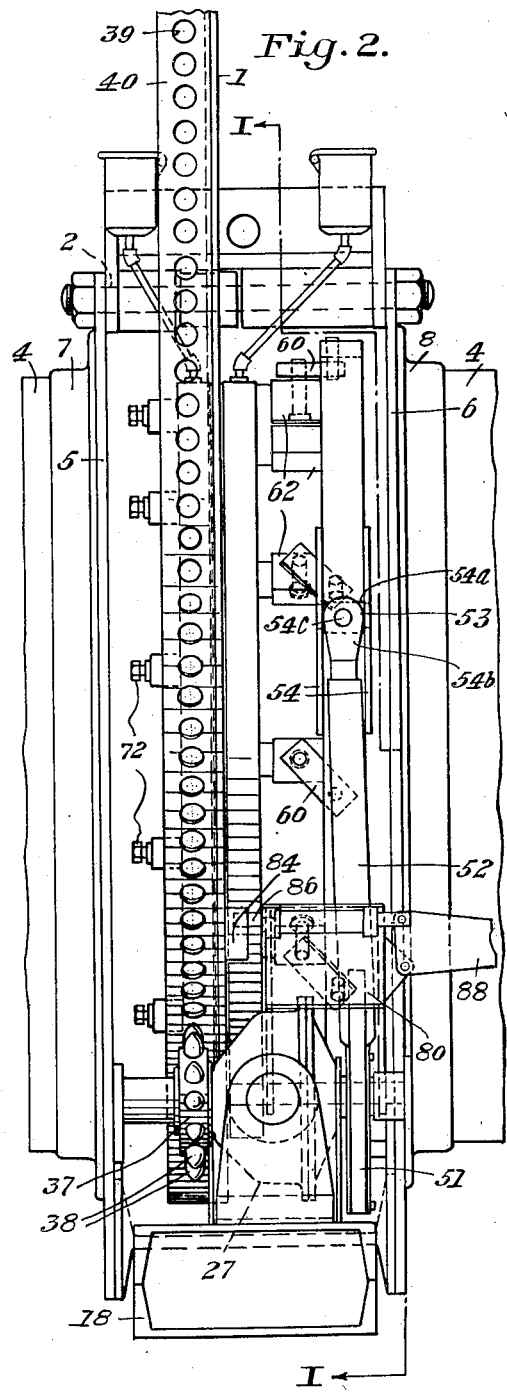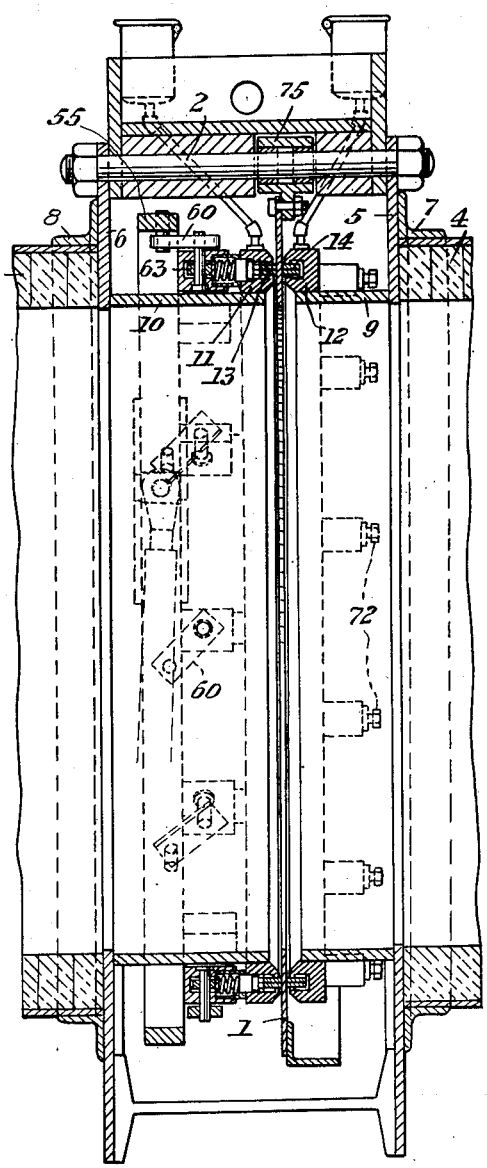

VALVE

Filed July 23, 1937  5 Sheets-Sheet 3

INVENTOR
Edgar E. Brosius
by his attorneys
Stebbins, Blenko & Parmelee

May 2, 1939.  E. E. BROSIUS  2,156,967

VALVE

Filed July 23, 1937  5 Sheets-Sheet 4

INVENTOR
Edgar E. Brosius
by his attorneys
Stebbins, Blenko & Parmelee

May 2, 1939.  E. E. BROSIUS  2,156,967

VALVE

Filed July 23, 1937  5 Sheets-Sheet 5

INVENTOR
Edgar E. Brosius
by his attorneys
Stebbins, Blenko & Parmelee.

Patented May 2, 1939

2,156,967

UNITED STATES PATENT OFFICE 2,156,967

VALVE

Edgar E. Brosius, Pittsburgh, Pa.

Application July 23, 1937, Serial No. 155,242

12 Claims. (Cl. 137—139)

This application is a continuation-in-part of my copending application Serial No. 726,945, filed May 22, 1934.

The present invention relates to valves, and more particularly to the type of valves known as "goggle valves" used in the gas lines in steel plants. A goggle valve has a steel plate which is swung laterally across the gas line to close it, or is swung in the opposite direction to bring the hole in the goggle plate into register with the gas line to open the valve. In my improved valve the parts are so constructed and arranged that the valve seats are first released from the goggle plate, then the goggle plate is swung, and thereafter the valve seats are reapplied to the goggle plate, upon either the opening or closing of the valve. The operation of the parts is preferably accomplished by a motor-driven differential. The valve seats or sealing means are of novel construction and preferably formed of a laminated structure. The seats are retained in a holding in such manner as to be forced into contact with the goggle plate or released from sealing relation with respect thereto.

In the drawings which illustrate the preferred embodiment of my invention:

Fig. 1 is a view taken principally in elevation but also in section along the line I—I of Fig. 2, the view being taken axially along the gas line, the gas line being removed to better show the valve itself;

Fig. 2 is a side elevation of the goggle valve;

Fig. 3 is a section along the line III—III of Fig. 1;

Figure 4:
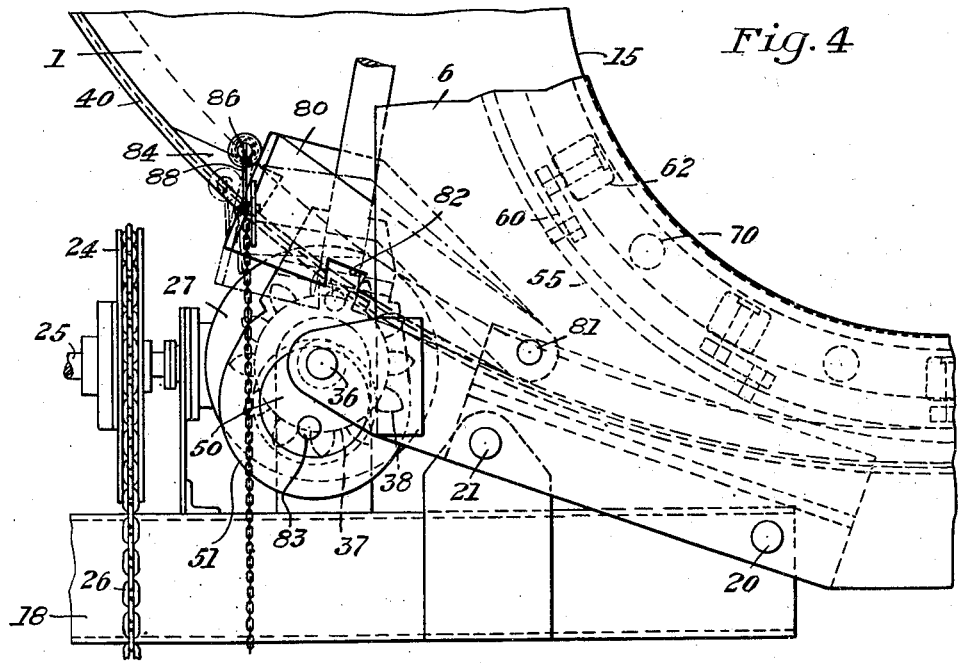
Fig. 4 is an enlarged elevation of the differential drive showing the valve open.
Figure 5:
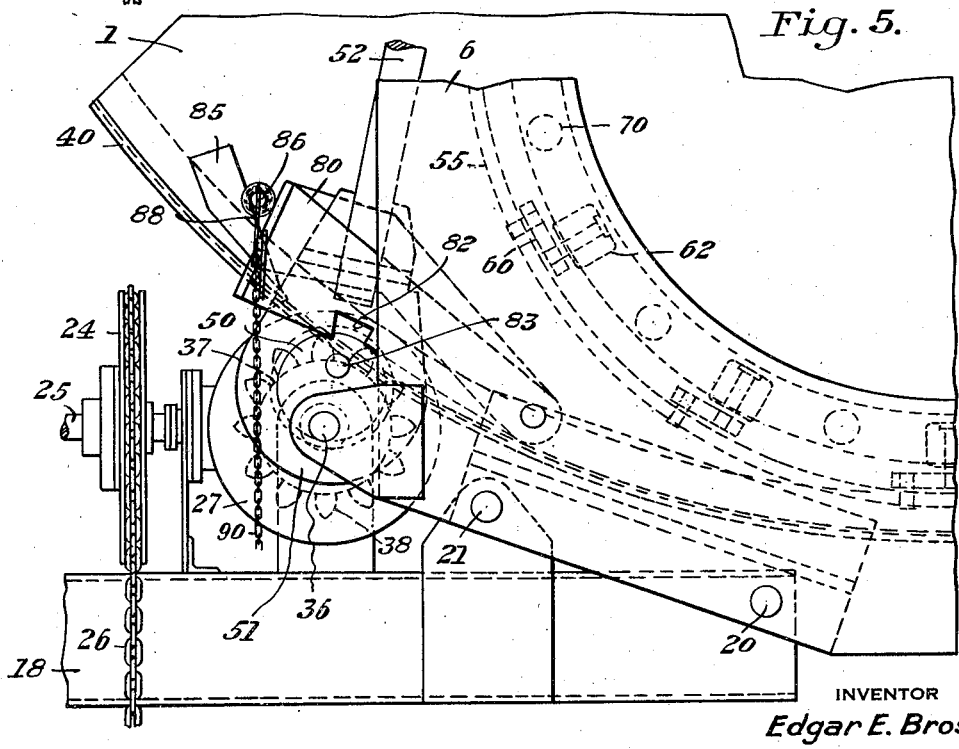
Fig. 5 is a similar view showing the valve closed.
Figure 6:
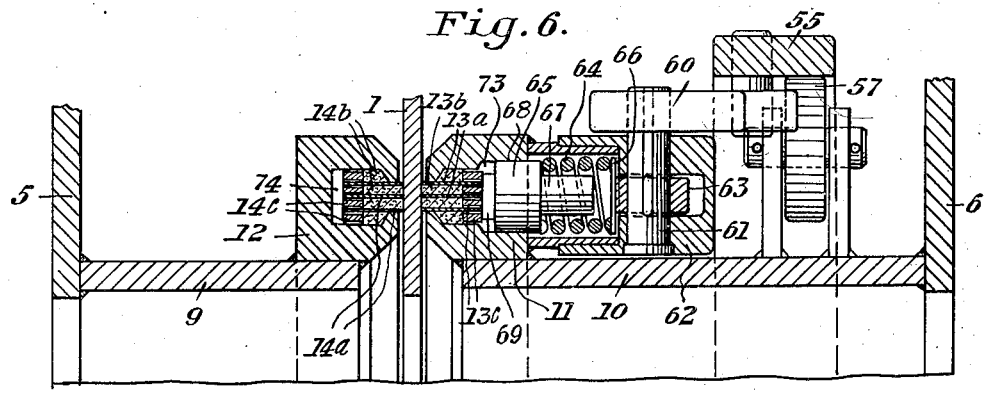
Fig. 6 is an enlarged section through the sealing means showing one of the cam-operated spring devices.

In the illustrated embodiment of the invention, reference numeral 1 indicates the valve or goggle plate which is pivoted to swing about a pin 2 on the valve frame, which is indicated generally by reference numeral 3. The valve frame 3 is adapted to be interposed in a gas line, the adjacent ends of sections of the gas line being indicated at 4. The frame 3 has supporting flanges 5 and 6 which are welded to annular rings 7 and 8 respectively of angular cross section on the ends of the gas line sections 4. Rings 9 and 10 are welded to the flanges 5 and 6 respectively and form continuations within the valve frame of the gas line. The rings 9 and 10 support respectively ring-like frames 12 and 11 which carry the seats for the sealing means which engage the goggle plate to make a gas-tight fit therewith. The frame 11 has an annular groove opening toward the valve plate in which is a valve seat 13. The valve seat, as shown in more detail in Fig. 6, is of laminated construction and consists of a plurality of sheet metal rings 13a set edgewise to the surface of the valve plate, and strips of oil-pervious packing material 13b. The sheet metal rings are preferably made of strips of hard corrosion-resisting steel, such as stainless steel, in order to resist wear and corrosion. The packing material used for the strips 13b is preferably the fabric made from asbestos fiber and interwoven copper wires used for the brake linings in automobiles prior to its impregnation with the brake lining compounds. This material, while affording a firm sealing contact with the goggle plate, is pervious to oil and allows the grease which is packed in the groove behind the packing material to ooze through it and lubricate the face next to the valve plate. The valve seat 13 is movable inwardly and outwardly of the slot to be applied to or released from the valve plate by mechanism hereinafter described. Opposite the valve seat 13 is a similar valve seat 14 located in the groove in the ring-like frame 12 and adapted to bear against the opposite side of the valve plate.

Figure 7:
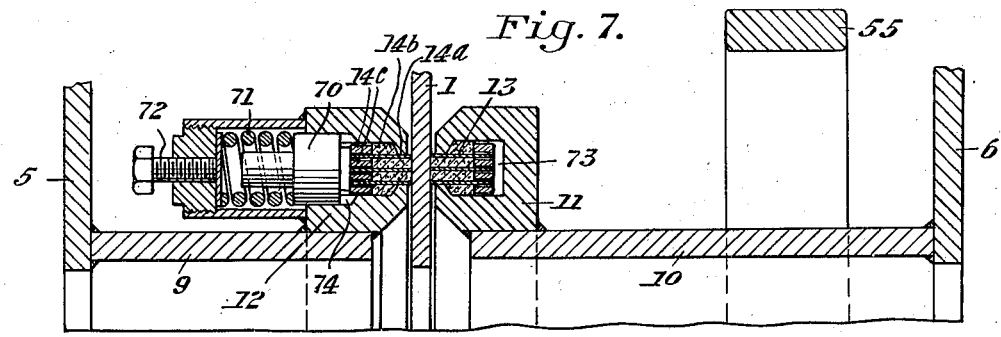
Fig. 7 is another enlarged section through the sealing means showing one of the spring devices on the opposite side of the valve plate.
Figure 12:
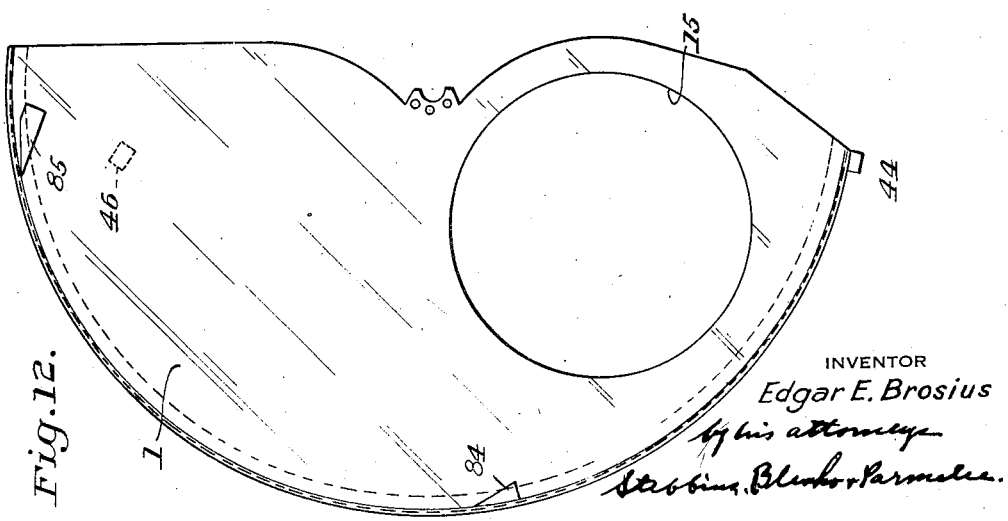
Fig. 12 is an elevation of the valve plate.

The valve plate itself is shown in Fig. 12. It consists of an arcuate shaped plate adapted to be swung about the axis of the pin 2 to open or close the valve. The valve plate has an opening 15 which registers with the gas line when the valve is open, as shown in Figs. 1 and 6, and an imperforate portion 16 which closes the valve when the valve plate is swung to the right, as shown in Fig. 7. The valve plate is arranged to be swung to the valve opening and closing positions, and the valve seats released and applied, by motor-driven mechanism now to be described.

An electric motor 17 is mounted on a supporting frame 18 at the bottom and at one side of the valve. The frame 18 has a hollow supporting beam 19 which is secured to the valve frame by means of pins 20 and 21 which engage through holes in the frame flanges 5 and 6. The motor and its frame can be readily removed from the valve structure proper by taking out the pins 20 and 21 and the pin 54c of the universal joint hereinafter described without disturbing the valve, in case it is desired to repair the motor or the motor-driven differential. A chain wheel 24 is mounted on the motor shaft 25 to permit manual operation of the valve be means of the chain 26, if desired. A differential, indicated generally by the reference numeral 27, is driven by the motor shaft 25. This differential is shown in section in Fig. 11 and is of the type used for the differential drive of an automobile.

Figure 11:
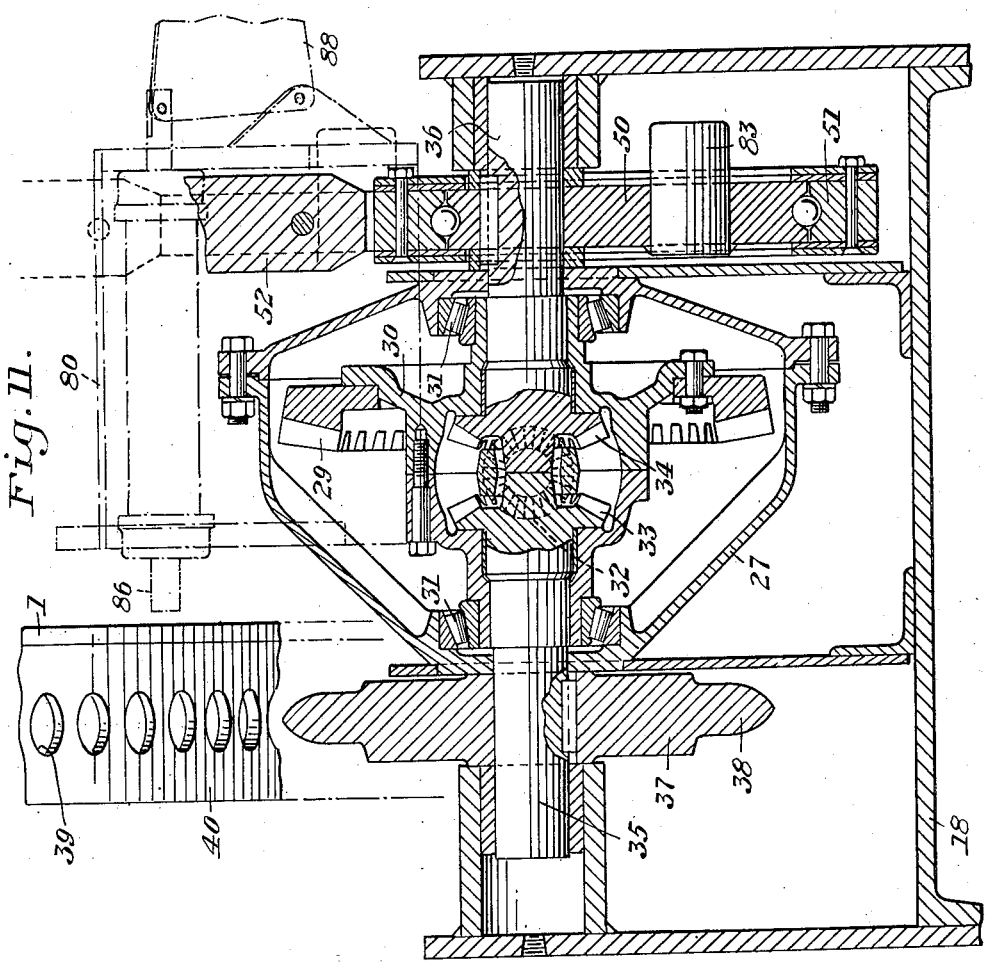
Fig. 11 is a section through the differential drive.

Referring more especially to Fig. 11, reference numeral 29 indicates the large beveled gear of the differential which is carried by the spider 30. The gear 29 is driven by means of a pinion (not shown) on the end of the motor shaft 25. The differential spider 30 is mounted upon the bearings 31 at each end. The differential spider carries pinions 32 which mesh with the gears 33 and 34 splined upon the ends of the countershafts 35 and 36 respectively. As above stated, this differential is the usual type employed in automobile drives and need not be described in greater detail as its construction and operation is well known. The shafts 35 and 36 are driven by the differential. The differential will drive either the shaft 35 or the shaft 36, whichever is free to turn. If one shaft is locked the differential will drive the other shaft.

The shaft 35 carries a pin wheel 37 having projecting pins 38 which engage in the perforations 39 in a gear plate 40 which is welded on the curved outer edge of the valve plate I and extends at right angles to the plane of the valve plate.

The pin wheel 37 serves to swing the valve plate I from open to closed position or vice versa. The movement of the valve plate when swung to the valve opening position is arrested at the end of the stroke by a stop 44 located at the right-hand end of the plate which engages an abutment 45 on the valve frame. The movement of the valve plate in its valve closing stroke is arrested by a stop 46 which engages an abutment 47 on the valve frame.

The valve seating or sealing means is arranged to be actuated from the differential. An eccentric 50 is rigidly mounted on the differential shaft 36 and is surrounded by an eccentric sleeve 51 carried on the lower end of a rod 52 which actuates the movement of the valve seat 13. The upper end of the connecting rod 52 is secured to a rotatable ring 55 by means of a universal joint 53. The ring 55 has two outwardly extending plates or arms 54 through which is passed a pin 54a (Fig. 1). The upper end of the connecting rod 52 has a fork 54b which is connected with the pin 54a by means of a pin 54c. This arrangement provides a universal joint from which the pin 54c may be removed when it is desired to remove the motor from the valve. The ring 55 is supported by rollers 57 and is given a limited turning movement by the up and down movement of the connecting rod 52. The ring 55 is connected to the free ends of a plurality of arms 60 which are mounted upon a plurality of cam shafts 61 journaled in brackets 62 carried by the valve frame. Each shaft 61 has a cam 63 which is turned to apply and release pressure to and from a spring 64 connected with a spring-pressed plunger 65. A wear plate 66 is interposed between the end of the spring 64 and the cam 63. The other end of the spring is supported on the stem 67 of the plunger 65. The plungers 65 extend through holes 68 drilled through the back of the ring 11 and opening into the rear of the slot which holds the laminated seat 13. The plungers 65 have reduced ends 69 which contact with the back face of the valve seat 13. The back face of the valve seat 13 is provided with a plurality of steel rings 13c which back up the strips of packing material and insure an even seating of the packing material against the valve plate.

When the connecting rod 52 is drawn to its lowermost position, as shown in Fig. 2, the cam shafts 31 are turned to apply spring pressure to the plungers 35 and through them to the valve seat 13, which is thereby clamped firmly against the face of the valve plate I. The springs 64 are stiff and the valve seat is applied to the valve plate with the pressure of several tons, so that it serves not only as a seating or sealing means to prevent the escape of gases, but also has a locking means to prevent movement of the valve plate until the spring pressure is released, which occurs when the connecting rod 52 is pushed upwardly and thereby through the ring 52 turns the cam shafts to release the plungers 65. The seating or sealing means 14 at the opposite side of the valve plate is of similar construction and similarly mounted in the ring-like frame 12. The plurality of spring-held plungers 70 engage the back of the sealing means, as shown in Fig. 7. Each plunger is provided with a helical spring 71 which may be adjusted by means of a set screw 72 so as to provide an even contact of the seat 14 along the valve plate. The seat 14 has supporting rings 14c similar to the rings 13c to back up the packing strips 14b and insure tight contact. The sealing means 14 is formed of laminated construction like the seating means 13, having strips of hard stainless steel interposed between the strips of packing material.

As shown in Fig. 1, the plungers 65 and 70 are not arranged opposite from each other but are staggered, which insures better contact of the valve seats against the plate.

The grooves for holding the valve seats 13 and 14 are cut in solid metal rings 11 and 12. The cuts are made from the faces of these rings which are next to the valve plate. A special cutting tool is employed which undercuts the groove so as to give the enlarged back portions. The backs of the grooves are solid, as indicated in the drawings. The solid backs are drilled at intervals to take the plungers 65 and 70. The casings for these plungers are welded to the backs of the rings 11 and 12 respectively. In assembling the valve seats, the spaces indicated at 73 and 74 respectively on Figures 7 and 6 in the slots behind the seats 13 and 14 are filled with grease, which is retained by the packing. Then the two narrower strips of the packing 13b and 14b which lie in the undercut parts of the groove, together with their backing up rings 13c and 14c, are put into the groove from the front face and pressed into the undercut portions. Then the three metal strips 13a and 14a and the strips of packing material 13b and 14b between them, together with their backing up rings 13c and 14c, are put into the grooves through the open mouths thereof. Since the back of the grooves is closed, the grease is retained in the backs of the grooves behind the valve seats 13 and 14 and can ooze slowly through the packing. The grease thus serves to lubricate the valve seat so that it can be reciprocated freely into and out of its retaining groove. The grease also impregnates the exposed face of the valve seat and makes a good substantially gas-tight sealing contact with the valve plate. The grease also prevents leakage of gas around the back side of the valve seats 13 and 14.

The valve plate 1 is bolted to a sleeve 75 which is rotatably mounted on the bearing pin 2 to allow the valve plate to be freely swung. The sleeve 75 (Fig. 3) also has freedom for sliding movement along the pin 2 to allow the valve plate to move slightly when it is released or clamped by the valve seats.

Figures 8, 9:
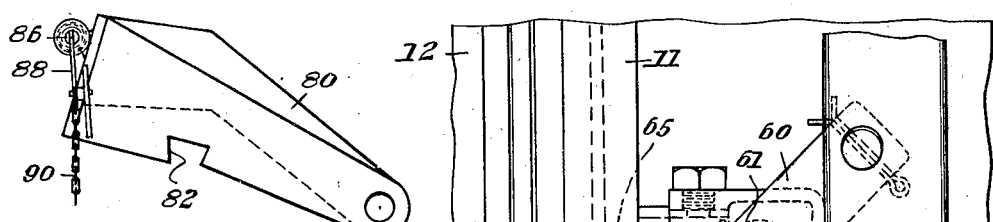
Fig. 8 is a detail view showing one of the cam-operated spring devices in elevation.
Fig. 9 is an elevation of the latch for locking the sealing means actuating mechanism.
Figure 10:
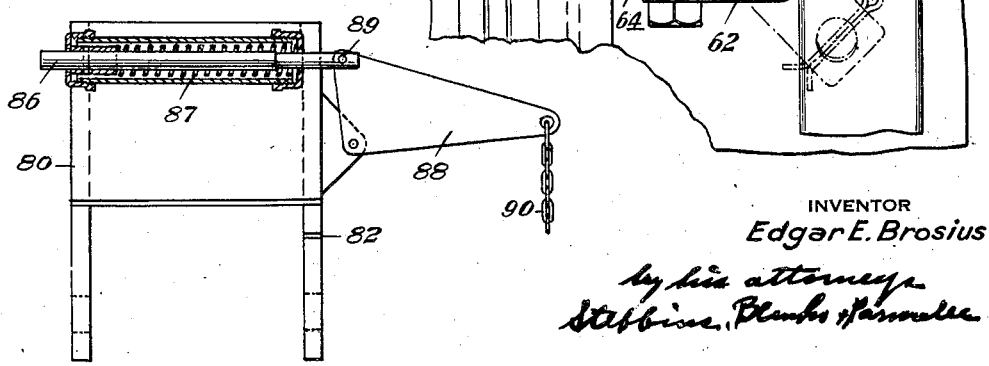
Fig. 10 is another view of the latch.

The eccentric 50 is locked in position to hold the valve seats released from the valve plate during the swinging movement of the valve plate by means of a latch 80 shown in detail in Figs. 9 and 10. The latch is pivoted at 81 to the valve frame. It has a notch 82 arranged to fit over and hold a pin 83 which extends from the eccentric 50. When the pin 83 is out of engagement with the latch, the downward movement of the latch is limited by contact with the top of the housing of the differential. During substantially the entire opening and closing strokes of the valve plate 1, the latch 80 is free to drop into engagement with the pin 83. The latch, however, is raised at the extreme limits of the opening and closing strokes of the valve plate 1 by means of wedge-shaped pieces 84 and 85 respectively, which are welded to the side of the valve plate 1 near its periphery. The release of the latch 80 at these times is for the purpose of allowing the valve seat actuating mechanism to operate when the valve is fully open or closed.

The latch 80 is raised by either of the wedges 84 or 85 coming beneath and contacting with the projecting end of a retractible latch pin 86. The pin is ordinarily held in its projected position by means of a helical spring 87. The pin, however, may be retracted against the spring pressure by means of a bell crank lever 88 having a loose pin and slot connection 89 with the other end of the latch pin 86 and having a chain 90 dependent from the other end of the lever, so that the latch pin 86 may be retracted by an operator standing beneath the valve. These goggle valves are usually located overhead in the steel mill. By retracting the latch pin 86, the latch 80 can be manually released and brought into position to engage the pin 83 and thus lock the eccentric 50.

The operation of the valve actuating mechanism is as follows:

Assume that the valve is in its open position as shown in Fig. 1. The latch 80 is raised by contact with the wedge-shaped detent 84. The eccentric pin 83 is in its lowermost position and the valve seat 13 is applied with its sealing and locking pressure against the valve plate around the hole 15. The motor 17 is a reversible motor, and the operator throws the switch to drive the motor in the direction to close the valve. The pin wheel 37 and the differential shaft 35 are locked against movement by the locking pressure of the valve seat against the valve plate, but the eccentric 50 and its shaft 36 are free to turn. The eccentric is driven until the connecting rod 52 is raised sufficiently to release the clamping pressure on the valve seat against the valve plate, whereupon during the normal operation of the mechanism the valve plate moves downwardly and to the right, as viewed in Fig. 1, under the influence of gravity, the pin wheel 37 and differential shaft 35 turning at the speed permitted by the motor, which is electrically driven but under no load. Since the downward movement of the plate tends to drive the shaft 35, the rotation of the eccentric 50 stops temporarily, usually with the eccentric pin 83 somewhere about in its half raised position. As soon as the downward movement of the plate 1 begins, the wedge shaped detent 84 moves from beneath the latch pin 86 and the latch 80 drops into position where it can engage the eccentric pin 83 when the eccentric pin is moved to its uppermost position. The downward swinging movement of the valve plate 1 continues under gravity until it swings past its lowermost position or otherwise encounters some resistance to movement, whereupon the turning movement of the pin wheel 37 temporarily stops and the movement of the eccentric 50 is continued until the pin 83 reaches its uppermost position, where it is engaged and held by the latch 80, thus locking the eccentric against further movement. Thereupon the motor, through the differential, drives the pin wheel 37 to complete the closing movement of the valve until the movement of the valve plate is arrested by the contact of the stop 46 with the abutment 47. When this occurs the wedge shaped detent 85 has moved under the end of the latch pin 86, raising the latch and releasing the eccentric. Since the movement of the valve plate is now positively stopped, the motor drives the eccentric 50 to draw the connecting rod 52 downwardly and clamp the valve seat 13 against the valve plate. When the connecting rod 50 is drawn to its lowermost position, the operator opens the motor switch to stop the motor. For the convenience of the operator, a plumb-bob 95 is suspended from a cord 96 attached to some part of the universal joint 54 or the upper end of the connecting rod 52. The operator, by looking at the plumb-bob, can tell when it is in its lowermost position and opposite the stationary marker 97, and then open the motor switch.

The valve is now closed. To open the valve the operator throws the motor switch in the other direction. The motor first drives the eccentric 50 to raise the connecting rod 52 until the locking pressure against the valve plate is released. Thereupon the valve plate is free to swing downwardly and to the left from the dotted line position shown in Fig. 1 under the influence of gravity. During this downward movement the pin wheel 37 and shaft 35 are turned by the downward movement of the valve plate, the motor being electrically driven but under no load to permit such movement. The movement of the eccentric 50 stops temporarily while the valve plate is thus moving down by gravity. Such downward movement of the valve plate under gravity continues until some resistance is encountered to further movement of the valve plate, whereupon the movement of the pin wheel 37 and the differential shaft 35 temporarily stops, and the eccentric 50 is driven until the pin 83 reaches its uppermost position, where it is positively engaged and locked by the latch 80. The pin wheel 37 is then driven by the motor and the valve plate swung to its open position, where the hole 15 registers with the gas line. When the valve plate is swung to its fully opened position, the stop 44 engages the abutment 45 to lock the valve plate against further movement. At the same time the wedge shaped detent 84 reaches the latch 80 to release the pin 83. The continued driving movement of the motor then turns the eccentric 50 to draw down the connecting rod 52 and apply the valve seat 13 against the valve plate, whereupon the operator by observing the plumb-bob 95 opens the switch.

The above description is of the usual and normal operation of the valve. Sometimes, however, the valve plate may stick so that when the valve seat is initially released from it, the valve plate will not start a downward movement under gravity but will stay in its initial either fully opened or closed position, in which the latch 80 is held raised by one of the detents 84 or 85. Under these conditions the eccentric 50 is free to turn and will continue to turn unless the latch 80 is manually released. When the operator observes that the valve plate is stuck, he pulls the cord 90, retracting the latch pin 86 and thus allowing the latch 80 to drop into position where it engages and locks the pin 83 on the eccentric, which occurs when the pin 83 is brought to its uppermost position by the continued rotation of the eccentric, at which point the valve seat 13 is released. Since the eccentric 50 and its shaft 36 are positively locked, the full power of the motor is applied through the driven eccentric shaft 35 and the pin wheel 37 to move the valve plate.

The goggle valve can be opened or closed by the single manual operation of the operator closing and opening the motor switch. It is only in the case of an emergency where the valve plate is stuck that the manual release of the latch 80 is required.

In case of failure of power or motor trouble, the valve can be operated manually by means of the chain 26.

The hardened steel strips 13a of the valve seat effectively scrape the face of the valve free from encrustations or deposits and keeps the valve plate in good condition. The oil-saturated packing material of the valve seat makes a particularly effective gas-tight seal, as well as supplying lubrication to the plate and valve seat. The greater part of the valve seats 13 and 14 lie within their holding grooves and are thereby protected against the hot gases, only the faces and very short portions of the valve seats projecting beyond the grooves.

While I have specifically illustrated and described the preferred embodiment of the invention, it is to be understood that the invention is not so limited but may be otherwise embodied and practiced within the scope of the following claims.

I claim:

1. A valve comprising a valve element adapted to be moved to open and closed positions, stops for arresting the movement of the valve element at the completions of its opening and closing movements, sealing means adapted to be applied to the valve element in both its open and closed positions and to be released from the valve element during its opening and closing movements, means for operating the valve element and its sealing means comprising a differential and means for driving the differential, the differential having two driven elements each of which may be driven by the differential when the other element is locked against movement, connections between the first driven element and the valve element for moving the valve element to open and closed positions, and connections between the second driven element and the sealing means for applying the sealing means to and releasing it from the valve element, the parts being so constructed and arranged that, when the valve is in either normal open or closed position and the differential is driven, the sealing means is first released from the valve element by the movement of the second driven element, then the valve element which is thus released is moved to its other position by the first driven element until its movement is arrested by one of its stops, whereupon the sealing means is again applied to the valve element by the second driven element.

2. A valve comprising a valve element adapted to be moved to open and closed positions, sealing means adapted to be applied to the valve element in both its open and closed positions and to be released from the valve element during its opening and closing movements, means for operating the valve element and its sealing means comprising a differential and means for driving the differential, the differential having two driven elements each of which may be driven by the differential when the other element is held against movement, connections between the first driven element and the valve element for moving the valve element to open and closed positions, and connections between the second driven element and the sealing means for applying the sealing means to and releasing it from the valve element, the parts being so constructed and arranged that, when the valve is in either normal open or closed position and the differential is driven, the sealing means is first released from the valve element by the movement of the second driven element, then the valve element which is thus released is moved to its other position by the first driven element, whereupon the sealing means is again applied to the valve element by the second driven element.

3. A valve comprising a valve element adapted to be moved to open and closed positions, means for arresting the movement of the valve element at the completions of its opening and closing movements, locking and sealing means adapted to be applied to the valve element in both its open and closed positions and to be released from the valve element during its opening and closing movements, means for operating the valve element and its locking and sealing means comprising a differential and means for driving the differential, the differential having two driven elements, each of which may be driven by the differential when the other element is locked against movement, connections between the first driven element and the valve element for moving the valve element to open and closed positions, connections between the second driven element and the locking and sealing means for applying such means to and releasing such means from the valve element, the parts being so constructed and arranged that, when the valve is in either normal open or closed position and the differential is driven, the second driven element operates to release the locking and sealing means from the valve element, then the first driven element moves the valve element which is thus released to its open position, whereupon the second driven element again applies the locking and sealing means to the valve element.

4. A valve comprising a passage and a valve plate interposed across the passage and having a perforate portion adapted to register with the passage to open the valve and an imperforate portion adapted to register with the passage to close the valve, sealing means adapted to be applied against the valve plate around its periphery when the valve is in its open position and to be applied against the imperforate portion of the valve plate when the valve is in its closed position, a common actuating means connected to the valve plate and to the sealing means and including a differential and means for driving the differential, the differential having two driven elements each of which may be driven by the differential when the other element is held against movment, connections between the first driven element and the valve plate for moving the valve plate to open and closed positions, connections between the second driven element and the sealing means for applying the sealing means to and releasing it from the valve plate, the parts being so constructed and arranged that when the valve is in either normal open or closed position and the differential is driven, the sealing means is first reelased from the valve plate by the movement of the second driven element, then the valve plate which is thus released is moved to its other position by the first driven element, whereupon the sealing means is again applied to the valve plate by the second driven element.

5. A valve comprising a passage and a valve plate interposed across the passage and having a perforate portion adapted to register with the passage to open the valve and an imperforate portion adapted to register with the passage to close the valve, means for sealing the valve plate adapted to be applied against the valve plate around its periphery when the valve is in its open position and to be applied against the imperforate portion of the valve plate when the valve is in its closed position and for locking the valve plate against movement, and a common actuating means connected to the valve plate and to the means for sealing and locking the valve plate comprising a differential and means for driving the differential, the differential having two driven elements each of which may be driven by the differential when the other element is held against movement, connections between the first driven element and the valve plate for moving the valve plate to open and closed positions, connections between the second driven element and the means for sealing and locking the valve plate, the parts being so constructed and arranged that, when the valve is in either normal open or closed position and the differential is driven, the second driven element first releases from the valve plate the means for sealing and locking it, then the first driven element moves the valve plate to its other position, whereupon the second driven element again applies to the valve plate the means for sealing and locking it.

6. A valve comprising a valve element adapted to be moved to open and to closed positions, sealing means adapted to be applied to the valve element in both its open and closed positions and to be released from the valve element during its opening and closing movements, means for operating the valve element and its sealing means comprising a differential and means for driving the differential, the differential having two driven elements each of which may be driven by the differential when the other element is held against movement, connections between the first driven element and the valve element for moving the valve element to open and closed positions, connections between the second driven element and the sealing means for applying the sealing means to and releasing it from the valve element, a latch for locking the second driven element and arranged to be released when the valve element is moved to its open or its closed position, the parts being so constructed and arranged that, when the valve is in either normal open or closed position and the differential is driven, the sealing means is first released from the valve element by the movement of the second driven element, then the valve element which is thus released is moved toward its other position by the first driven element and the latch locks the second driven element, until the valve element reaches its other position, whereupon the latch is released from the second driven element and the sealing means is again applied to the valve element by the second driven element.

7. A valve comprising a valve plate, a seat supporting frame at one side of the plate having a slot therein, a valve seat in the slot movable toward and away from the plate, spring means for exerting pressure against said seat to urge it toward the valve plate, and means for applying and relieving the pressure on said spring means.

8. A valve comprising a valve plate, a seat supporting frame at one side of the plate having a slot therein, a valve seat in the slot movable toward and away from the plate, spring elements for exerting pressure against said seat to urge it toward the valve plate, and means movable relatively to the spring elements for putting them under pressure when said means is operated to one position and for relieving the pressure on said spring elements when said means is operated to another position.

9. A valve comprising a movable valve plate, a seat supporting frame at one side of the plate having a slot therein opening toward the plate, a valve seat member in said slot, means carried by the said supporting frame member for urging said valve seat against the valve plate, springs engaging said means, and means for varying the pressure on said springs.

10. A valve comprising a valve plate, a seat supporting frame at one side of the plate having a slot therein opening toward the plate, a valve seat in the slot adapted to be urged into sealing engagement with the plate, and means for resiliently applying pressure to said valve seat, said means being movable into and out of operative position.

11. A goggle valve comprising a valve frame adapted to be mounted on the conduit in which the valve is interposed, a motor and a differential driven thereby mounted upon a frame removably pinned to the valve frame, means for actuating the valve plate comprising a gear driven by the differential and engaging a rack on the valve plate, sealing means for the valve plate, and means for actuating the sealing means from the differential having a removable pin connection, whereby the motor and differential may be removed and disconnected from the valve plate and sealing means by the removal of the pins connecting the motor supporting frame with the valve frame and the differential with the sealing means.

12. A valve for hot gas lines comprising a valve plate, a seat supporting frame at one side of the plate and having a slot opening toward the valve plate, a valve seat slidably mounted in the slot and having its back and the greater portion of its sides protected against the hot gases by the slot, means at the back of the slot also portected against the hot gases engaging the valve seat for moving the valve seat outwardly of the slot to bring its face into sealing engagement with the valve plate and for releasing the valve seat from the valve plate.

EDGAR E. BROSIUS.

CERTIFICATE OF CORRECTION.

Patent No. 2,156,967. May 2, 1939.

EDGAR E. BROSIUS.

It is hereby certified that error appears in the printed specification of the above numbered patent requiring correction as follows: Page 1, first column, line 22, after the word "holding" insert groove; line 45-46, for "com-operated" read cam-operated; and that the said Letters Patent should be read with this correction therein that the same may conform to the record of the case in the Patent Office.

Signed and sealed this 30th day of May, A. D. 1939.

(Seal)
Henry Van Arsdale
Acting Commissioner of Patents.